United States Patent [19]

Ishida et al.

[11] Patent Number: 5,447,647
[45] Date of Patent: Sep. 5, 1995

[54] SYNTHETIC LUBRICATING OIL

[75] Inventors: Noboru Ishida, Kawasaki; Motoshi Sunami, Tokyo; Umekichi Sasaki, Kawasaki; Tatsuyuki Ishikawa; Hiroshi Hasegawa, both of Yokohama, all of Japan

[73] Assignee: Nippon Oil Co., Ltd., Japan

[21] Appl. No.: 203,256

[22] Filed: Mar. 1, 1994

Related U.S. Application Data

[63] Continuation-in-part of Ser. No. 90,003, Jul. 12, 1993, abandoned, which is a continuation-in-part of Ser. No. 740,401, Aug. 5, 1991, abandoned.

Foreign Application Priority Data

Aug. 7, 1990 [JP] Japan ................. 2-207538

[51] Int. Cl.⁶ ............. C09K 5/04; C10M 105/38
[52] U.S. Cl. ................... 252/68; 252/56 S; 252/67
[58] Field of Search ........................... 252/68

[56] References Cited

U.S. PATENT DOCUMENTS

| | | | |
|---|---|---|---|
| 4,248,726 | 2/1981 | Uchinuma et al. | 252/68 |
| 4,267,064 | 5/1981 | Sasaki et al. | 252/68 |
| 4,454,052 | 6/1984 | Shoji et al. | 252/68 |
| 5,021,179 | 6/1991 | Zehler et al. | 252/68 |
| 5,202,044 | 4/1993 | Hagihara et al. | 252/68 |
| 5,211,884 | 5/1993 | Bunemann et al. | 252/68 |
| 5,290,465 | 3/1994 | Sabahi | 252/68 |

*Primary Examiner*—Ellen M. McAvoy
*Attorney, Agent, or Firm*—Cushman Darby & Cushman

[57] ABSTRACT

A refrigerator oil mainly comprises, as a base oil, an ester of a carboxylic acid having a specific structure represented by the formula

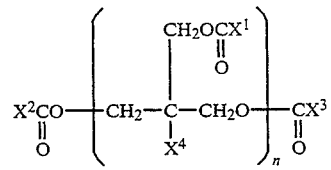

and at least one kind of an epoxy compound, which refrigerator oil is excellent in electrical insulating properties, stability to hydrolysis, wear resistance, non-hydroscopicity, compatibility with a hydrogen-containing halogeno carbon refrigerant, and thrmal stability and chemical stability.

10 Claims, No Drawings

SYNTHETIC LUBRICATING OIL

This application is a continuation-in-part of application Ser. No. 08/090,003, filed Jul. 12, 1993, now abandoned, which is a continuation-in-part of Ser. No. 07/740,401, filed Aug. 5, 1991, now abandoned.

BACKGROUND OF THE INVENTION

1. Field of the Invention

This invention relates to a lubricating oil for compressors of refrigerators using therein a hydrogen-containing halogenocarbon as a refrigerant (the oil being hereinafter referred to as "a refrigerator oil for use with a hydrogen-containing halogenocarbon refrigerant") and, more specifically, it relates to such a refrigerator oil which comprises a specific ester as a base oil and is superior in various properties.

2. Description of the Prior Art

Heretofore, as refrigerator oils, there have been usually used naphthenic mineral oils having a kinematic viscosity of from 10–200 cSt at 40° C., paraffinic mineral oils, alkylbenzenes, polyglycol oils, mixtures thereof, and blends of these base oils and additives.

On the other hand, as halogeno carbon refrigerants used in refrigerators, there are utilized CFC-11, CFC-12, CFC-115, HCFC-22 and the like.

Of these halogeno carbon refrigerants, CFC-1, CFC-12, CFC-115 and the like in which all the hydrogen atoms of a hydrocarbon are replaced with halogen atoms such as chlorine atoms tend to break an ozone layer, and for this reason, the employment of these halogeno carbons is regulated under a law. Therefore, hydrogen-containing halogeno carbons, above all, hydrofluoro carbons such as HFC-134a and HFC-152a are increasingly employed in place of the CFC series. In particular, HFC-134a is similar in thermodynamic properties to CFC-12 which has been heretofore used in many refrigerators such as domestic refrigerators, air-conditioners and car air-conditioners, and thus HFC-134a is promising as the replaceable refrigerant.

The refrigerator oil must meet various requirements, and the compatibility of the oil with the refrigerant is extremely important from the viewpoints of the lubricating properties and the system efficiency of the refrigerator. However, the refrigerator oil comprising a base oil such as the naphthenic mineral oil, the paraffinic mineral oil or the alkylbenzene is scarcely compatible with a non-chlorine halogeno carbon such as HFC-134a. Therefore, if such a kind of refrigerator oil is used in combination with HFC-134a, a two-layer separation occurs at ordinary temperature, and oil return properties which are most important in the refrigerator system deteriorate. In consequence, refrigeration efficiency decreases or lubricating properties decline, with the result that a compressor tends to burn and other problems occur inconveniently. Hence, the employment of the above-mentioned oil in combination with HFC-134a is not practical.

In order to solve these problems, the present inventors have developed a polyglycol refrigerator oil which is much more excellent in the compatibility with HFC-134a as compared conventional known refrigerator oils, and have already submitted a patent application regarding this refrigerator oil (Japanese Patent Application Laid-open Nos. 1-256594, 1-274191 and the like). In addition, U.S. Pat. No. 4,755,316 discloses a polyglycol refrigerator oil which is compatible with HFC-134a.

On the other hand, the refrigeration lubricant which can be used in the compressor of the domestic refrigerator or the like is required to have high electrical insulating properties. Of the known refrigerator oils, alkylbenzenes and the mineral oils have the highest electrical insulating properties, but as described above, they are scarcely compatible with a hydrofluoro carbon such as HFC-134a. Furthermore, the polyglycol oil which is excellent in compatibility with HFC-134a is poor in electrical insulating properties inconveniently.

The present inventors have found that an ester having a specific structure is excellent in compatibility with a halogeno carbon such as HFC-134a and has high electrical insulating properties, and they have already filed a patent application regarding this ester (Japanese Patent Application No. 1-341245 and the like).

However, the above-mentioned ester is excellent in various characteristics but brings about hydrolysis, and for this reason, it is not always suitable for devices such as a refrigerator and a car air-conditioner which are required to be driven keeping up a high reliability for a long period of time. Therefore, it is strongly desired to develop a refrigeration lubricant having high compatibility with a hydrogen-containing halogeno carbon such as HFC-134a, satisfactory electrical insulating properties, and stability to hydrolysis.

Heretofore, an ester synthetic oil is known as a synthetic oil having excellent heat resistance and used as a usual industrial lubricating oil or the like. However, this kind of oil involves the above-mentioned problem of the hydrolysis, and in consequence, the development of an ester synthetic oil having the excellent stability to the hydrolysis is largely expected.

An object of the present invention is to provide a refrigerator oil mainly comprising a specific ester and having high compatibility with a hydrogen-containing halogeno carbon such as HFC-134a, high electrical insulating properties, and the stability to hydrolysis.

SUMMARY OF THE INVENTION

The present inventors have paid much attention to various excellent characteristics of an ester synthetic oil and researched intensively so as to develop a refrigerator oil which can meet the above-mentioned requirements. As a result, it has been found that an ester of a carboxylic acid having a specific structure and a neopentyl polyol is excellent in compatibility with a hydrogen-containing halogeno carbon such as HFC-134a and has high electrical insulating properties, good stability to hydrolysis, excellent thermal stability and chemical stability, especially when incorporated with one or more epoxy compounds, and the present invention has been achieved on the basis of this knowledge.

That is, the present invention intends to provide a refrigerator oil which is characterized by comprising, as a base oil, at least an ester represented by the formula

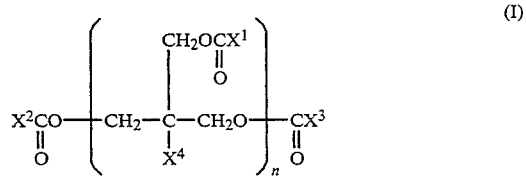

(wherein each of $X^1$, $X^2$ and $X^3$ is independently a hydrogen atom or a group represented by the formula

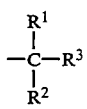

(II)

in terms of each repeating unit; $X^4$ is an alkyl group having 1 to 3 carbon atoms, —$CH_2OH$ or a group represented by the formula

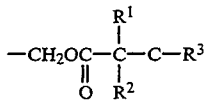

(III)

n is an integer of from 1 to 3; each of $R^1$ and $R^2$ is independently a methyl group or an ethyl group; $R^3$ is an alkyl group having 1 to 8 carbon atoms; but when $X^4$ is an alkyl group having 1 to 3 carbon atoms or —$CH_2OH$, all of $X^1$, $X^2$ and $X^3$ are not the hydrogen atoms simultaneously), and further comprising, as an additive, at least an epoxy compound.

The above-mentioned refrigerator oil mainly comprising the ester of the carboxylic acid having the specific structure and the neopentyl polyol is excellent in electrical insulating properties, stability to hydrolysis, wear resistance and non-hydrogroscopicity. In addition, this ester is also excellent in compatibility with a hydrogen-containing halogeno carbon, and therefore it is particularly desirable as a refrigerator oil. Further, by incorporating at least an epoxy compound in the ester to compose the refrigerator oil, thermal stability and chemical stability thereof can be conspicuously improved.

Heretofore, the effects of the specific ester represented by formula (I), especially when incorporated with one or more epoxy compounds, as refrigeration lubricants, were not known at all, and this kind of ester is not on the market and its industrial applications were not known.

DETAILED DESCRIPTION OF THE INVENTION

Now, the present invention will be described in more detail.

A refrigerator oil of the present invention mainly comprises one or a mixture of two or more of esters represented by formula (I). However, if an ester which does not fall within formula (I) is used as the main component, various excellent characteristics cannot be obtained such as compatibility with a hydrogen-containing halogeno carbon, stability to hydrolysis and heat resistance.

Typical examples of an alkyl group having 1 to 8 carbon atoms represented by $R^3$ in the above-mentioned formulae (II) and (III) include a methyl group, ethyl group, n-propyl group, iso-propyl group, n-butyl group, iso-butyl group, sec-butyl group, tert-butyl group, n-pentyl group, iso-pentyl group, neo-pentyl group, n-hexyl group, iso-hexyl group, n-heptyl group, iso-heptyl group, n-octyl group and iso-octyl group.

The ester synthetic oil represented by formula (I) is excellent in compatibility with a hydrogen-containing halogeno carbon, electrical insulating properties and stability to hydrolysis, but in particular, an ester represented by the following formula (IV) is preferable, since the above-mentioned effects of this ester are remarkable.

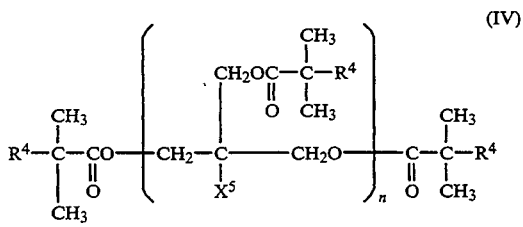

(IV)

(wherein $R^4$ is an alkyl group having 1 to 4 carbon atoms, $X^5$ is an alkyl group having 1 to 3 carbon atoms or

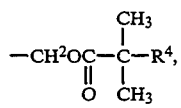

and n is 1 or 2).

The ester which can be used in the present invention can be prepared by an optional process, for example, by reacting 3 to 8 equivalents of a carboxylic acid represented by the formula $$X'—COOH \qquad (V)$$

[wherein $X'$ is identical with $X^1$, $X^2$ or $X^3$ in the formula (I)], with trimethylolethane, trimethylolpropane, trimethylolbutane, pentaerythritol, a dimer or a trimer thereof [above all, trimethylolpropane, di-(trimethylolpropane), tri-(trimethylolpropane), pentaerythritoal, di-(pentaerythritol), tri-(pentaerythritol) or a mixture thereof is preferable at a temperature of from 100° to 180° C. in the presence of an acid catalyst such as sulfuric acid. In the present invention, the ester may be used in the form of a mixture or a single substance. The thus obtained ester may be purified to remove by-products and unreacted materials therefrom, but small amounts of the by-products and the unreacted materials may be present in the ester, so long as they do not impair the excellent performance of the refrigerator oil according to the present invention.

No particular restriction is put on the molecular weight of the ester regarding the present invention, but from the viewpoint of improving the hermetic condition of a compressor, the number of average molecular weight of the ester is preferably from 200 to 3,000, more preferably from 300 to 2000. Furthermore, the kinematic viscosity of the ester to be used in the present invention is in the range of from 2 to 150 cSt, preferably 4 to 100 cSt at 100° C.

To further improve the refrigerator oil of the present invention in thermal stability and chemical stability, it is incorporated with at least one kind of an epoxy compound. The epoxy compound used herein is preferably selected from the group consisting of phenylglycidyl ether type epoxy compounds, alkylglycidyl ether type epoxy compounds, glycidyl ester type epoxy compounds, allyloxirane compounds, alkyloxirane compounds, alicyclic epoxy compounds, epoxidized fatty acid monoesters and epoxidized vegetable oils.

The said phenylglycidyl ether type epoxy compounds used herein include phenylglycidyl ether and alkylophenylglycidyl ethers. The said alkylphenylglycidyl ethers are those having 1 to 3 alkyl groups having 1 to 13 carbon atoms, among which are preferred those having an alkyl group having 4 to 10 carbon atoms, such as n-butylphenylglycidyl ether, 1-butylphenylglycidyl ether, sec-butylphenylglycidyl ether, tertbutylphenylglycidyl ether, pentylphenylglycidyl ether, hexylphenylglycidyl ether, heptylphenylglycidyl ether, octylphenylglycidyl ether, nonylphenylglycidyl ether and decylphenylglycidyl ether.

The alkylglycidyl ether type epoxy compounds include decylglycidyl ether, undecylglycidyl ether, dodecylglycidyl ether, tridecylglycidyl ether, tetradecylglycidyl ether, 2-ethylhexylglycidyl ether, neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ethers and polyalkylene glycol diglycidyl ethers.

The glycidyl ester .type epoxy compounds include phenylglycidyl esters, alkylglycidyl esters and alkenylglycidyl esters with glycidyl 2,2-dimethyl octanoate, glycidyl benzoate, glycidyl acrylate, glycidyl methacrylate and the like being preferred.

The allyloxirane compounds include 1,2-epoxystyrene and alkyl-1,2-epoxystyrene.

The alkyloxyirane compounds include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,2-epoxyoctadecane, 1,2-epoxynonadecane and 1,2-epoxyeicosane.

The alicyclic epoxy compounds include 1,2-epoxycyclohexane, 1,2-epoxycyclopentane, 3,4-epoxycyclohexylmethyl-3,4-epoxycyclohexane carboxylate, bis(3,4-epoxycyclohexylmethyl) adipate, exo-2,3-epoxynorbornane, bis (3,4-epoxy-6-methylcyclohexylmethyl) adipate, 2-(7-oxabicyclo[4.1.0]hept-3-yl)-spiro(1,3-dioxane-5,3,'-[7]oxabicyclo[4.1.0]heptane, 4-(1'-methylepoxethyl)-1,2-epoxy-2-methylcyclohexane and 4-epoxyethyl-1,2-epoxycyclohexane.

The epoxidized fatty acid monoesters include esters of an epoxidized fatty acid having 12 to 20 carbon atoms and an alcohol having 1 to 8 carbon atoms, phenol or an alkylphenol. In particular, butyl, hexyl, benzyl, cyclohexyl, methoxyethyl, octyl, phenyl or butylphenyl esters of epoxidized stearic acid may preferably be used.

The epoxidized vegetable oils include epoxidized compounds of vegetable oils such as soybean oil, linseed oil and cottonseed oil.

Among these epoxy compounds, the preferable ones include phenylglycidyl ether type epoxy compounds, alkylglycidyl ether type epoxy compound, glycidyl ester type epoxy compounds and alicyclic epoxy compounds.

It is desirable that these epoxy compounds be included in the refrigerator oil of the present invention in a ratio of 0.1–5.0% by weight, preferably 0.2–2.0% by weight, of the total amount of the refrigerator oil.

The refrigerator oil of the present invention should have a pour point which a usual refrigeration lubricant has, and for the purpose of preventing the solidification of the lubricating oil at a low temperature, the pour point of the lubricating oil is preferably −10° C. or less, more preferably from −20° to −80 ° C.

Typical examples of a refrigerant for the refrigerator in which the refrigerator oil of the present invention can be suitably used include hydrogen-containing halogenocarbons such as alkane fluorides having 1–3 carbon atoms, preferably 1–2 carbon atoms and/or alkane chloride fluoride having 1–3 carbon atoms, preferably 1–2 carbon atoms. The said hydrogen-containing halogenocarbons are exemplified by HFCs (chlorine-free type halogenocarbons) such as difluoromethane (HFC-32), trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a) and 1,1-difluoroethane (HFC-152a); HCFCs (chlorine-containing type halogenocarbons) such as monochlorodifluoromethane (HCFC-22), 1-chloro-1,1-difluoroethane (HCFC-142b), dichlorotrilfluoroethane (HCFC-123) and monochlorotetrafluoroethane (HCFC-124); and mixtures thereof. Among these hydrogen-containing halogenocarbons, the chlorine-free type halogenocarbons such as HFC-32, HFC-23, HFC-125, HFC-134, HFC-134a and HFC-152a, are preferable in view of the environmental problems. The refrigerant used may suitably be selected from these halogenocarbons mentioned above depending on the purpose for which the resulting refrigerant is used as well as the properties which are desirable for the resulting refrigerant. The preferable refrigerants are exemplified by HFC-134a; a mixture of HFC-134a (60–80 wt %) and HFC-32 (40–20 wt %); a mixture of HFC-32 (50–70 wt %) and HFC-125 (60–40 wt %); a mixture of HFC-134a (60 wt %), HFC-32 (30 wt %) and HFC-125 (10 wt %); a mixture of HFC-134a (52 wt %), HFC-32 (23 wt %) and HFC-125 (25 wt %); and a mixture of HFC-143a (52 wt %), HFC-125 (44 wt %) and HFC-134a (4 wt %).

As a base oil of the refrigerator oil of the present invention, one or more of the esters represented by formula (I) or (IV) may be used singly, but the refrigerator oil can contain other base oils for a lubricating oil such as the base oils of a refrigeration lubricant, and additives therefor, which will be described hereinafter. In this case, the ester represented by formula (I) or (IV) is contained in an amount of 50% by weight or more, preferably 70% by weight or more based on the total amount of the total weight of the refrigerator oil.

One or more base oils which can be mixed in with the esters represeted by formlua (I) or (IV) are exemplified as follows: Preferable examples of this base oil include polyoxyalkylene glycols, polyoxyalkylene glycol monoethers, polyoxy alkylene glycol diethers, polyoxyalkylene glycol glycerol ethers, complex esters of monools, diols, monocarboxylic acids and dicarboxylic acids, esters of carboxylic acids and neopentyl type polyols such as pentaerythritol, trimethylolpropane, dimers and trimers thereof, complex esters of neopentyl type polyols, monocarboxylic acids and dicarboxylic acids, and carbonates. These oils may be used singly or in combination of two or more thereof, as long as the esters represented by formula (I) or (IV) are present in the refrigerator oil in an amount of 50% by weight or more, preferably 70% by weight or more based on the total weight of the refrigerator oil as described earlier.

Oils such as paraffinic mineral oils, naphthenic mineral oils, poly α-olefins and alkylbenzenes may be mixed with the ester. However, these oils are poor in compatibility with hydrogen-containing halogeno carbon refrigerants, and so the amount of each oil is 30% by weight or less, preferably 20% by weight or less based on the total amount of the refrigerator oil.

Next, reference will be made to additives which can be included in the refrigerator oil in the present invention.

Preferable examples of additives include at least one phosphorus compound selected from the group consisting of a phosphate, an acidic phosphate, an amine salt of an acidic phosphate, a chlorinated phosphate and a phosphite in order to improve the wear resistance and the load resistance of the lubricating oil. Each of these phosphorus compounds is an ester of phosphoric acid or phosphorus acid and an alkanol or a polyether type alcohol, or a derivative of the ester. In the concrete, examples of the above-mentioned phosphate include tributyl phosphate, triphenyl phosphate and tricresyl phosphate. Examples of the acidic phosphate include ditetradecyl acid phosphate, dipentadecyl acid phosphate, dihexadecyl acid phosphate, deheptadecyl acid phosphate and dioctadecyl acid phosphate. Example of the amine salt of an acidic phosphate include salts of the above-mentioned acidic phosphates and amines such as methylamine, ethylamine, propylamine, butylamine, pentylamine, hexylamine, heptylamine, octylamine, dimethylamine, diethylamine, dipropylamine, dibutylamine, dipentylamine, dihexylamine, diheptylamine, dioctylamine, trimethylamine, triethylamine, tripropyleneamine, tributylamine, tripentylamine, trihexylamine, triheptylamine and trioctylamine. Examples of the chlorinated phosphate include tris•dichloropropyl phosphate, tris•chloroethyl phosphate, tris•chlorophenyl phosphate and polyoxyalkylene•bis[di(chloroalkyl)] phosphate. Examples of the phosphite include dibutyl phosphite, dipentyl phosphite, dihexyl phosphite, diheptyl phosphite, dioctyl phosphite, dinonyl phosphite, didecyl phosphite, diundecyl phosphite, didodecyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, triphenyl phosphite, tricresyl phosphite, and mixture thereof. When such phosphorus compound is included in the refrigerator oil, the phosphorus compound content is from 0.01 to 5.0% by weight, preferably from 0.01 to 2.0% by weight based on the total weight of the refrigerator oil.

In addition, a carboxylic acid represented by the formula $R^4$—CH(COOH)$^2$ and/or $R^5$—CH$_2$—CCOH (wherein $R^4$ and $R^5$ may be identical or different, and each of them is an alkyl group having 8 to 18 carbon atoms) can be blended with the lubricating oil in order to further improve the wear resistance and the load resistance of the lubricating oil. Typical examples of this carboxylic acid include octylamalonic acid, nonylmalonic acid, decylmalonic acid, undecylmalonic acid, dodecylmaronic acid, tridecylmaronic acid, tetradecylmaronic acid, pentadecylmaronic acid, hexadecylmalonic acid, heptadecylmaronic acid, octadecylmaronic acid, decanoic acid, undecanoic acid, lauric acid, tridecanoic acid, myristicic acid, pentadecanoic acid, palmitic acid, heptadecanoic acid, stearic acid, nonadecanoic acid, eicosanic acid and mixtures thereof. When each carboxylic acid is included in the refrigerator oil, the carboxylic acid content is from 0.01 to 3% by weight, preferably 0.05 to 2% by weight on the total weight of the refrigerator oil.

Needless to say, two or more of the above-mentioned phosphorus compound, epoxy compound and carboxylic acid may be used together.

Additionally, for the purpose of improving the characteristics of the refrigerator oil according to the present invention, the refrigerator oil can be blended with known additives for the refrigerator oil, if necessary. Examples of these additives include anti-oxidants of phenolic compounds such as di-tert-butyl-p-cresol and bisphenol A as well as amine compounds such as phenyl-α-naphthylamine and N,N-di(2-naphthyl)-p-phenylenediamine; a wear resistance such as zinc dithiophosphate; extreme pressure additives such as chlorinated paraffins and sulfur compounds; an oiliness improver such as a fatty acid; an anti-foaming agent such as a silicone compound; and a metal inactivating agent such as benzotriazole. These additives can be used singly or in combination. The total amount of these additives is usually 10% by weight, preferably 5% by weight or less based on the total weight of the refrigerator oil.

When the refrigerator oil of the present invention is used in a refrigerator, it is usually present in the form of a fluid composition for the refrigerator, which is a mixture of the refrigerator oil and hydrogen-containing halogenocarbon such as an alkane fluoride and/or an alkane chloride fluoride as mentioned above.

The present invention also relates to a fluid composition for a refrigerator, which comprises a nydrogen-containing halogenocarbon refrigerant and a refrigerator oil according to the present invention.

The mixing ratio of the refrigerator oil to the refrigerant in the resulting composition is not particularly limited, but the refrigerator oil is usually comprised in an amount of 1–500 parts by weight, preferably in an amount of 2–400 parts by weight, based on 100 parts by weight of the refrigerant.

Now, the present invention will be described in more detail in reference to examples and comparative examples, but the scope of the present invention should be not limited at all to these examples. In these examples, refrigerator oils simply comprising, as a base oil, esters regarding the present invention and, as an additive, an epoxy compound will be referred to, but needless to say, the refrigerator oils to which other base oils and additives are added can also exert similar effects.

EXAMPLES 1-17 AND COMPARATIVE EXAMPLES 1-8

First, base oils according to this invention (Base oils 1-4) and comparative base oils of conventional types (Base oils 5-8), which are used in the Examples and Comparative Examples as shown in the following Table 1 are illustrated as follows:

Base oil 1:

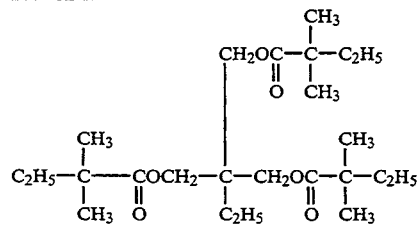

Base oil 2:

-continued

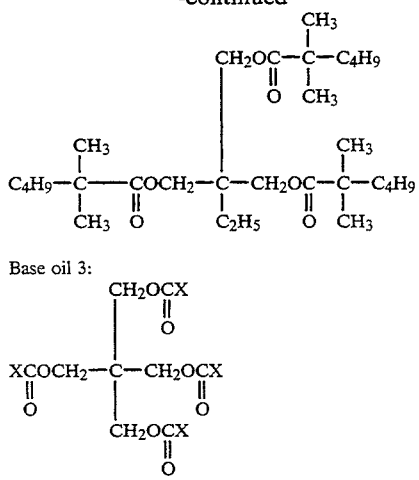

Base oil 3:

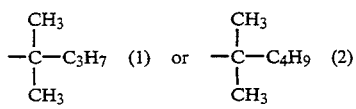

(wherein X is

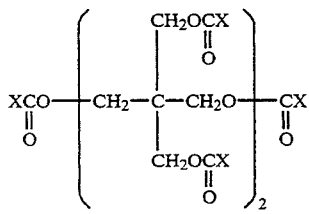

and a molar ratio of (1) to (2) is 1:1).

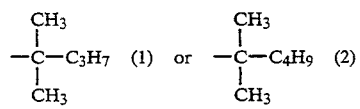

(wherein X is $$-\underset{\underset{CH_3}{|}}{\overset{\overset{CH_3}{|}}{C}}-C_3H_7 \quad (1) \quad or \quad -\underset{\underset{CH_3}{|}}{\overset{\overset{CH_3}{|}}{C}}-C_4H_9 \quad (2)$$

and a molar ratio of (1) to (2) is 1:1).

Base oil 5: Naphthenic mineral oil.
Base oil 6: Polyoxypropylene glycol monobutyl ether (average molecular weight about 1,000).
Base oil 7: Polyoxypropylene glycols (average molecular weight about 1,000).
Base oil 8: Tetraesters of pentaerythritol, n-heptanoic acid, and n-octanic acid.

Epoxy compounds used in the Examples are also shown in Table 1.

The refrigerator oils of Examples 1–17 according to the present invention each of which has a composition indicated in Table 1 were prepared and then evaluated for their performances that are their miscibility with HFC-134a, insulating property, wear resistance, hygroscopicity and thermal and chemical stability by the following respective test methods. The results thus obtained are indicated in Table 1.

For comparison, the mineral oil (Comparative Example 1), the polypropylene glycol monoalkyl ethers (Comparative Example 2), the polypropylene glycols (Comparative Examples 3) and the straight-chain fatty acid esters of polyol alcohols (Comparative Example 4) which have heretofore been used as refrigerator oils, as well as Base oils 1–4 to which no epoxy compound was added (Comparative Examples 5–8), were evaluated for their performances in the same manner as in Example 1–17. The results thus obtained are also indicated in Table 1.

(Compatibility with HFC-134a)

0.2 g of a sample oil and 2.0 g of a refrigerant (HFC-134a) for each of examples and comparative examples were placed in a glass tube having an internal diameter of 6 mm and a length of 220 mm, and the glass tube was then sealed. This glass tube was put in a low-temperature tank or a high-temperature tank having a predetermined temperature, and it was observed whether or not the sample oil and the refrigerant were separated or became a milky turbidity state.

(Hydrolysis test)

60 g of a sample oil and 0.6 g of water were placed in a glass test tube having a volume of 200 ml, and a copper plate, an iron plate and an aluminum plate were further placed therein as deterioration accelerating catalysts. Afterward, the test tube was heated at 175° C. for 168 hours in a stainless steel autoclave.

(Insulating properties)

A volume resistivity of a sample oil at 25° C. was measured in accordance with JIS C 2101.

(FALEX wear test)

A sample oil was subjected to shakedown drive at a test oil temperature of 100° C. for 1 minute under load of 150 lb., and then used during driving for 2 hours under a load of 250 lb in accordance with ASTM D 2670. Afterward, the wear amount of a test journal was measured.

(Hygroscopicity)

30 g of a sample oil was placed in a 300-ml beaker and then allowed to stand in a constant temperature/constant humidity chamber for 7 days in which a temperature of 30° C. and a humidity of 60% were maintained. Afterward, a water content in the sample oil was measured in accordance with the Karl Fischer method.

(Thermal and chemical stability)

Thermal and chemical stabilities of the test oils were evaluated by the following sealed tube test with HFC-134a in accordance with JIS K 2211 4.9.

A equal-volume mixture of each of the test oils and the refrigerant (HFC-134a) was sealed, together with copper, iron and aluminum catalysts, in a glass tube and then heated to 250° C. for 168 hours to observe discoloration of the test oil and surface states of the catalysts and determine the degree of discoloration. The degree of discoloration of the test oil was classified into 9 grades ranging from 0 (no discoloration) to 8 (black-brown color).

TABLE 1

| Example | Base oils | Epoxy Compounds* | Amount (wt %) | Kinematic viscosity @100° C. (mm²/s) | Miscibility with HCF-134a Mis. Temp. Range (°C.) | Hydrolysis properties Acid value (mgKOH/g) | Resistivity @25° C. (Ωcm) | Falex test Amount of journal worn (mg) | Hydroscopicity 60° C., 30% (%) | Oil color | Sealed tube test Cu | Sealed tube test Fe | Sealed tube test Al |
|---|---|---|---|---|---|---|---|---|---|---|---|---|---|
| Ex. 1 | 1 | PGE | 0.5 | 5.6 | −70–80 | 0.4 | $2.6 \times 10^{14}$ | 9 | 0.18 | 1 | No change | No change | No change |
| Ex. 2 | 2 | s-BuPGE | 0.5 | 4.6 | −70–80 | 0.5 | $1.1 \times 10^{14}$ | 6 | 0.12 | 1 | No change | No change | No change |
| Ex. 3 | 3 | t-BuPGE | 0.5 | 5.0 | −70–80 | 0.3 | $1.5 \times 10^{14}$ | 5 | 0.13 | 1 | No change | No change | No change |
| Ex. 4 | 4 | DODECYLGE | 0.5 | 8.3 | −42–80 | 0.5 | $1.0 \times 10^{14}$ | 3 | 0.09 | 1 | No change | No change | No change |
| Ex. 5 | 1 | PGE | 1.0 | 5.6 | −70–80 | 0.4 | $2.6 \times 10^{14}$ | 8 | 0.18 | 1 | No change | No change | No change |
| Ex. 6 | 2 | s-BuPGE | 1.0 | 4.6 | −70–80 | 0.4 | $1.0 \times 10^{14}$ | 6 | 0.12 | 1 | No change | No change | No change |
| Ex. 7 | 3 | t-BuPGE | 1.0 | 5.0 | −70–80 | 0.3 | $1.4 \times 10^{14}$ | 4 | 0.13 | 1 | No change | No change | No change |
| Ex. 8 | 4 | DODECYLGE | 1.0 | 8.3 | −42–80 | 0.4 | $1.0 \times 10^{14}$ | 4 | 0.09 | 1 | No change | No change | No change |
| Ex. 9 | 1 | DECYLGEs | 1.0 | 5.6 | −70–80 | 0.4 | $2.5 \times 10^{14}$ | 7 | 0.18 | 1 | No change | No change | No change |
| Ex. 10 | 2 | EPCH | 1.0 | 4.6 | −70–80 | 0.2 | $1.0 \times 10^{14}$ | 7 | 0.12 | 1 | No change | No change | No change |
| Ex. 11 | 3 | EP.DODEC. | 1.0 | 5.0 | −70–80 | 0.3 | $1.4 \times 10^{14}$ | 4 | 0.13 | 1 | No change | No change | No change |
| Ex. 12 | 4 | EP.SOY. | 1.0 | 8.3 | −42–80 | 0.4 | $1.0 \times 10^{14}$ | 2 | 0.09 | 1 | No change | No change | No change |
| Ex. 13 | 1 | EP.St.B | 1.0 | 5.6 | −70–80 | 0.5 | $2.5 \times 10^{14}$ | 6 | 0.18 | 1 | No change | No change | No change |
| Ex. 14 | 1 | PGE | 2.0 | 5.5 | −70–80 | 0.3 | $1.0 \times 10^{14}$ | 8 | 0.18 | 1 | No change | No change | No change |
| Ex. 15 | 2 | s-BuPEG | 2.0 | 4.5 | −70–80 | 0.4 | $1.0 \times 10^{14}$ | 5 | 0.12 | 1 | No change | No change | No change |
| Ex. 16 | 3 | t-BuPGE | 2.0 | 4.9 | −70–80 | 0.2 | $1.3 \times 10^{13}$ | 3 | 0.13 | 1 | No change | No change | No change |
| Ex. 17 | 4 | DODECYLGE | 2.0 | 8.2 | −42–80 | 0.4 | $9.8 \times 10^{13}$ | 3 | 0.09 | 1 | No change | No change | No change |
| Comp. Ex. 1 | 5 | None | — | 5.1 | Immiscible | 0.1 | $3.8 \times 10^{15}$ | 23 | 0.01 | — | — | — | — |
| Comp. Ex. 2 | 6 | None | — | 10.8 | −70–56 | 0.1 | $1.2 \times 10^{11}$ | 35 | 1.01 | — | — | — | — |
| Comp. Ex. 3 | 7 | None | — | 10.2 | −51–64 | 0.1 | $4.8 \times 10^{10}$ | 30 | 1.81 | — | — | — | — |
| Comp. Ex. 4 | 8 | None | — | 4.9 | Immiscible | 22.5 | $1.8 \times 10^{14}$ | 12 | 0.11 | — | — | — | — |
| Comp. Ex. 5 | 1 | None | — | 5.7 | −70–80 | 0.4 | $2.8 \times 10^{14}$ | 8 | 0.18 | 3 | No change | Luster decreased | No change |
| Comp. Ex. 6 | 2 | None | — | 4.7 | −70–80 | 0.5 | $1.2 \times 10^{14}$ | 7 | 0.12 | 3 | No change | Luster decreased | No change |
| Comp. Ex. 7 | 3 | None | — | 5.1 | −70–80 | 0.3 | $1.6 \times 10^{14}$ | 5 | 0.13 | 4 | No change | Luster decreased | No change |
| Comp. Ex. 8 | 4 | None | — | 8.4 | −42–80 | 0.5 | $1.1 \times 10^{14}$ | 3 | 0.09 | 4 | No change | Luster decreased | No change |

*PGE: Phenyl Glycidyl Ether
s-BUPGE: s-Butylphenyl Glycidyl Ether
t-BuPGE: t-Butylphenyl Glycidyl Ether
DODECYLGE: Dodecyl Glycidyl Ether
DECYLGEs: Glycidyl 1,1-Dimethyloctanoate
EPCH: 1,2-Epoxycyclohexane
EP.DODEC.: 1,2-Epoxydodecane
EP.SOY.: Epoxydized Soy Bean Oil
EP.St.B: Epoxydized Butyl Stearate
(The amount "wt %" of the epoxy compound is based on the weight of the refrigerator oil)

It is apparent from the results indicated in Table 1 that the refrigerator oils (Examples 1-17) of the present invention are all excellent in miscibility with a refrigerant, HFC-134a, stability to hydrolysis, electrical insulating property, wear resistance, and non-hydroscopicity, as compared with those of Comparative Examples.

As is apparent from the results indicated in Table 1, the esters of Comparative Example 4 in which the alkyl groups of the acid moiety are all straight-chain ones, and the mineral oil of Comparative Example 1 are inferior in miscibility with the refrigerant. Further, the esters of Comparative Example 4 show poor resistance to hydrolysis.

Table 1 further shows that the ethers of Comparative Example 2 as well as the polyoxypropylene gycols of Comparative Examples 3 are excellent in miscibility with the refrigerant, but the ethers and glycols are inferior in electrical insulating property thereby rendering them unusable for hermetic type compressors. Still further, Table 1 shows that the ethers and glycols of Comparative Examples 2-3 have hygroscopicity 5-10 times that of the refrigerator oils of Examples 1-17.

The FALEX wear test shows that the refrigerator oils of Examples 1-17 are superior in wear resistance to those of Comparative Examples 1-4.

The refrigerator oils of Comparative Examples 5-8 which are free from epoxy compounds are equivalent to those of Examples 1-17 of the present invention in miscibility with HFC-134a, resistance to hydrolysis, insulating property, wear resistance and hydroscopicity, but, as is apparent from the results of the sealed tube test, the refrigerator oils of Comparative Examples 5-8 are quite inferior in thermal and chemical stability as compared with the refrigerator oils of Examples 1-17.

As is apparent from the above comparative experiments, the refrigerator oils of the present invention are suitable for use in refrigerators using therein a hydrogen-containing halogenocarbon as a refrigerant and are excellent in electrical insulating property, wear resistance, nonhygroscopicity and thermal and chemical stability. In other words, the refrigerator oils of the present invention excellently have all properties which are important for refrigerator oils.

What is claimed is:

1. A refrigerator oil for use in compressors using therein a hydrogen-containing halogenocarbon as a refrigerant, comprising, as a base oil, at least an ester represented by the formula

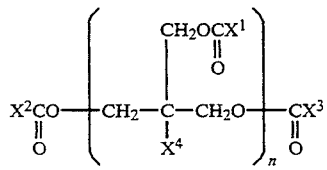

wherein each $X^1$, $X^2$ and $X^3$ is independently a hydrogen atom or a group represented by the formula

in terms of each repeating unit; $X^4$ is an alkyl group having 1 to 3 carbon atoms, —$CH_2OH$ or a group represented by the formula

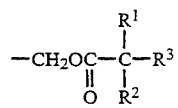

n is an integer of from 1 to 3; each of $R^1$ and $R^2$ is independently a methyl group or an ethyl group; $R^3$ is an alkyl group having 1 to 8 carbon atoms; but when $X^4$ is the alkyl group having 1 to 3 carbon atoms or —$CH_2OH$, all of $X^1$, $X^2$ and $X^3$ are not the hydrogen atoms simultaneously; and further comprising, as an additive, at least an epoxy compound.

2. The refrigerator oil according to claim 1 wherein the ester is represented by the formula

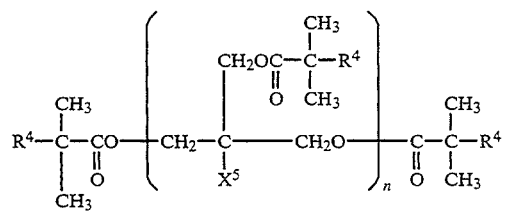

wherein $R^4$ is an alkyl group having 1 to 4 carbon atoms, $X^5$ is an alkyl group having 1 to 3 carbon atoms or

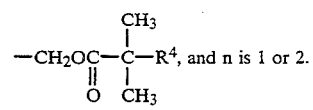

3. The refrigerator oil according to claim 1 wherein the number average molecular weight of said ester is from 200 to 3000.

4. The refrigerator oil according to claim 1 wherein the ester content is 50% by weight or more based on the total weight of said refrigerator oil.

5. The refrigerator oil according to claim 1, wherein the epoxy compound is selected from the group consisting of phenylglycidyl ether type epoxy compounds, alkylglycidyl ether type epoxy compounds, glycidyl ester type epoxy compounds, allyloxirane compounds, alkyloxirane compounds, alicyclic epoxy compounds, epoxidized fatty acid monoesters and epoxidized vegetable oils.

6. The refrigerator oil according to claim 1, wherein the epoxy compound content is 0.1 to 5.0% by weight based on the total weight of the refrigerator oil.

7. A fluid composition for a refrigerator, which comprises, as a refrigerant, a hydrogen-containing halogenocarbon refrigerant and the refrigerator oil defined in claim 1.

8. The fluid composition according to claim 7, wherein the refrigerator oil content is 1 to 500 parts by weight based on 100 parts by weight of the hydrogen-containing halogenocarbon refrigerant.

9. The refrigerator oil according to claim 1, wherein a hydrogen-containing chlorine-free halogenocarbon is used as the refrigerant.

10. The fluid composition according to claim 7, wherein the refrigerant is a hydrogen-containing chlorine-free halogenocarbon refrigerant.

* * * * *